US008321660B2

(12) United States Patent
Ju et al.

(10) Patent No.: US 8,321,660 B2
(45) Date of Patent: Nov. 27, 2012

(54) METHOD AND DEVICES FOR REPRODUCING ENCRYPTED CONTENT AND APPROVING REPRODUCTION

(75) Inventors: Hak-soo Ju, Suwon-si (KR); Myung-sun Kim, Uiwang-si (KR); Ji-young Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1141 days.

(21) Appl. No.: 12/049,609

(22) Filed: Mar. 17, 2008

(65) Prior Publication Data

US 2009/0013172 A1 Jan. 8, 2009

(30) Foreign Application Priority Data

Jul. 2, 2007 (KR) .................. 10-2007-0066192

(51) Int. Cl.
*H04L 29/06* (2006.01)
*H04L 9/00* (2006.01)
*G06F 21/00* (2006.01)

(52) U.S. Cl. ............ 713/150; 713/193; 726/4; 380/277; 705/52

(58) Field of Classification Search .................. 713/153, 713/193, 150, 189; 380/277; 726/4; 705/52
See application file for complete search history.

(56) References Cited

U.S. PATENT DOCUMENTS

| 5,557,678 | A | * | 9/1996 | Ganesan ............... 380/282 |
| 5,623,546 | A | * | 4/1997 | Hardy et al. ........... 713/193 |
| 5,764,762 | A | * | 6/1998 | Kazmierczak et al. ... 705/52 |
| 5,764,772 | A | * | 6/1998 | Kaufman et al. ........ 380/30 |
| 6,072,876 | A | * | 6/2000 | Obata et al. ............ 380/286 |
| 6,253,193 | B1 | * | 6/2001 | Ginter et al. ............ 705/57 |
| 6,859,535 | B1 | * | 2/2005 | Tatebayashi et al. ... 380/201 |
| 7,003,667 | B1 | * | 2/2006 | Slick et al. ............. 713/182 |
| 7,210,036 | B2 | * | 4/2007 | Luzzatto ............... 713/171 |
| 7,308,431 | B2 | * | 12/2007 | Asokan et al. .......... 705/67 |
| 7,343,014 | B2 | * | 3/2008 | Sovio et al. ........... 380/278 |
| 7,383,205 | B1 | * | 6/2008 | Peinado et al. ......... 705/26 |
| 7,571,471 | B2 | * | 8/2009 | Sandhu et al. ......... 726/17 |
| 7,840,993 | B2 | * | 11/2010 | Ganesan et al. ........ 726/7 |

(Continued)

FOREIGN PATENT DOCUMENTS

JP  2003/234728 A  8/2003

(Continued)

OTHER PUBLICATIONS

Noar, Dalit et al., "Revocation and Tracing Schemes for Stateless Receivers," Feb. 24, 2001. pp. 1-33.

(Continued)

*Primary Examiner* — Philip Chea
*Assistant Examiner* — Shu Chun Gao
(74) *Attorney, Agent, or Firm* — Sughrue Mion, PLLC (57) ABSTRACT

A reproduction method capable of immediately revoking a leaked device key by dividing the device key into a first partial key and a second partial key is provided. The reproduction method includes the operations of receiving encrypted content to be reproduced, requesting a token for decrypting the received content from an external device containing a first partial key of a device via a network, receiving the requested token from the external device, and decrypting the received token by using a second partial key contained in the device, thereby preventing content encrypted and distributed before revocation of an illegally copied device from being reproduced, and minimizing damage due to key leakage.

11 Claims, 4 Drawing Sheets

U.S. PATENT DOCUMENTS

| | | | |
|---|---|---|---|
| 2002/0169977 A1* | 11/2002 | Chmaytelli .................... | 713/200 |
| 2002/0199102 A1* | 12/2002 | Carman et al. ................ | 713/168 |
| 2003/0147536 A1* | 8/2003 | Andivahis et al. ............ | 380/277 |
| 2004/0062400 A1* | 4/2004 | Sovio et al. ................... | 380/286 |
| 2005/0033967 A1* | 2/2005 | Morino et al. ................ | 713/182 |
| 2005/0117747 A1* | 6/2005 | Valenti et al. .................. | 380/44 |
| 2007/0258594 A1* | 11/2007 | Sandhu et al. ................ | 380/277 |
| 2007/0277240 A1* | 11/2007 | Durfee et al. .................. | 726/24 |
| 2008/0229104 A1* | 9/2008 | Ju et al. ......................... | 713/169 |

FOREIGN PATENT DOCUMENTS

| | | | |
|---|---|---|---|
| KR | 10-2002-0041857 A | | 6/2002 |
| KR | 10-2005-0119115 A | | 12/2005 |

OTHER PUBLICATIONS

Dodis, Yevgeniy et al., "Scalable Public-Key Tracing and Revoking," pp. 1-39.

Naor, Moni et al., "Efficient Trace and Revoke Schemes (Preliminary Version)," Dept. Computer Science and Applied Math, Weizmann Institute of Science. Rehovot, Israel. 20 pages.

Office Action dated Jul. 14, 2011 from the Korean Intellectual Property Office in counterpart Korean application No. 10-2007-0066192.

Boneh et al. "A Method of Fast Revocation of Public Key Certificates and Security Capabilities." 10th USENIX Security Symposium, 2001, pp. 1-12.

* cited by examiner

METHOD AND DEVICES FOR REPRODUCING ENCRYPTED CONTENT AND APPROVING REPRODUCTION

CROSS-REFERENCE TO RELATED PATENT APPLICATION

This application claims priority from Korean Patent Application No. 10-2007-0066192, filed on Jul. 2, 2007 in the Korean Intellectual Property Office, the disclosure of which is incorporated herein in its entirety by reference.

BACKGROUND OF THE INVENTION

1. Field of the Invention

Methods and devices consistent with the present invention relate to reproducing encrypted content and approving reproduction of the encrypted content, and more particularly, to decrypting and reproducing encrypted content by using a security mediated module and a reproduction device to which a first partial key and a second partial key, for constructing a device key, are respectively allocated.

2. Description of the Related Art

Recently, various software titles (hereinafter referred to as "content") such as a game program, voice data, image data, a Word document preparation program, and the like are distributed via a network, such as the Internet, or storage mediums, such as a Digital Video Disc (DVD), a Compact Disc (CD), or the like. Such distributed content may be stored in a storage (recording) medium, such as a memory card, a hard disk, or the like, wherein the storage medium is installed in a reproduction device, such as a Personal Computer (PC), a game apparatus, or the like, which is owned by users. After the content is stored, the stored content may be used by reproducing the content from the storage medium.

In general, for software content, such as a game program, voice data, image data, and the like, distribution rights that are a kind of copyright are granted to manufacturers and content providers (CPs) related to the software content. Thus, in distribution of the software content, a certain usage prohibition is generally set so as to allow only a formal user to use the software content, and security is considered so that unauthorized copying of the software content is not performed.

One of the methods of prohibiting usage by users is to encrypt content that is to be distributed, and to make only an authorized user obtain a means by which the content is to be decrypted. For example, when various kinds of encrypted content, such as voice data, image data, a game program, or the like are distributed via the Internet, or the like, a content key that is a means for decrypting the distributed encrypted content is also given to a user that has been confirmed to be an authorized user.

As illegal copying of content in multimedia contents industry has recently increased, a variety of technologies for protecting content have been researched and developed. Such examples include a Conditional Access System (CAS) for protecting broadcasting contents, Digital Rights Management (DRM) for determining whether to allow digital content to be used according to rights regarding the digital content, and digital content protection technologies for storage media such as a Content Scrambling System (CSS), Content Protection for Recordable Media (CPRM), and an Advanced Access Content System (AACS).

These technologies for protecting content usually encrypt the content by employing encryption technologies and the like, so that the contents can be distributed or sold to users, and the contents can be protected by controlling only an authorized user access to a content key by which the contents can be deciphered.

Here, a related art method of encrypting data encrypts data by using a public key or a secret key of another party, and transmits the data. However, in the case of multimedia data having a huge amount of data, separate encryption of content by each user has very low efficiency since high-volume content is encrypted with keys that are always different. Thus, in most cases, content protection systems use a two-step encryption method in which one content key is used to encrypt the same contents. However, in some cases, user keys respectively owned by each user are used to encrypt the one content key.

The user key may be a device key stored in various devices using content, such as a digital television, a set-top box, an MPEG Audio Layer-3 (MP3) player, a portable video player, a DVD player, a Blu-ray player, and the like.

Many content protection systems encrypt a content key by using a key of a content device, thereby controlling content to be used only in a specific content device. That is, content is encrypted with a content key and distributed. Also, the content key is encrypted with a device key and distributed. Thus, a content device receives the encrypted content and content key, decrypts the encrypted content key by using the device key, and then finally decrypts the encrypted content by using the decrypted content key.

A content key has to be distributed to only an authorized user. Thus, when a distributed reproduction device is revoked by being illegally copied, the reproduction device should not be considered any more as an authorized user.

Figure 1:
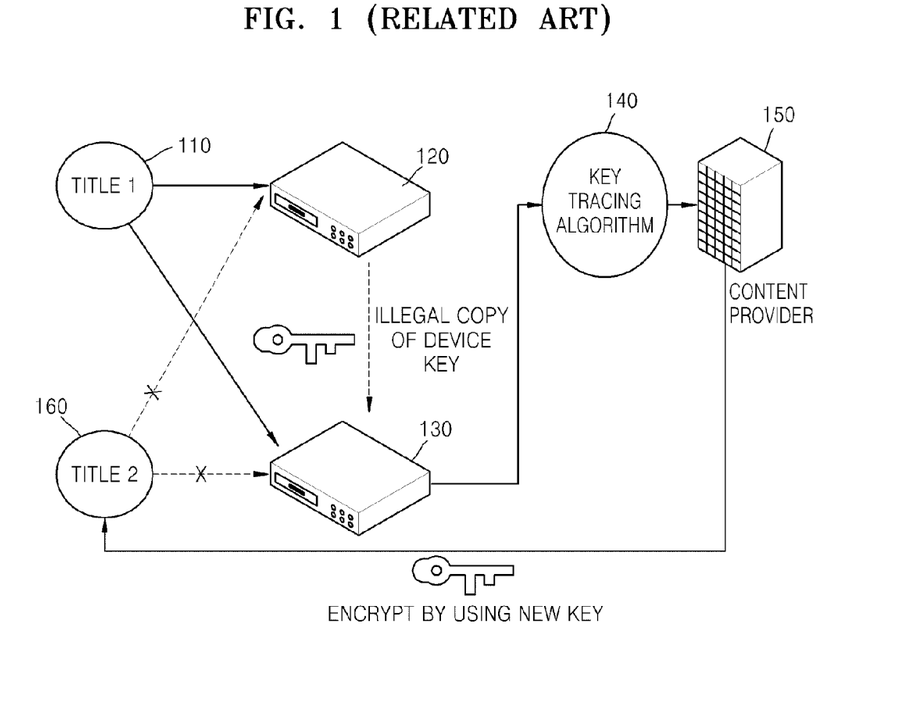
FIG. 1 is a diagram illustrating a related art process of revoking a device when a key of the device has been leaked.

FIG. 1 is a diagram illustrating a related art process of revoking a device when a key of the device has been leaked.

Referring to FIG. 1, an case is illustrated in which a device key is illegally copied and leaked among devices which are authorized to use a storage medium (title 1) 110 having recorded thereon predetermined encrypted software content, when the storage medium (title 1) 110 is being distributed.

Regarding a device 120, a key of which is leaked, and a clone device 130, a CP may later obtain information on the leaked device key via a key tracing algorithm 140.

After that, the CP revokes the corresponding devices 120 and 130, and then encrypts corresponding software content by using a new key.

Thus, title 2 160 of the newly encrypted software cannot be reproduced in the device 120, the key of which is leaked, or in the clone device 130.

A related art revocation system is performed by using the aforementioned method. However, such a method has problems since the method can only protect content, e.g., the title 2 that is newly encrypted and distributed after an illegally copied device is revoked, but cannot retroactively prevent content, e.g., the title 2 that is previously encrypted and distributed, from being reproduced.

SUMMARY OF THE INVENTION

In order to solve the aforementioned problems, the present invention provides methods and devices for reproducing encrypted content and approving reproduction of the encrypted content, which can immediately revoke a leaked device key by using a security mediated module and a reproduction device, which respectively have a first partial key and a second partial key, which are keys divided from a device key.

According to an aspect of the present invention, there is provided a method of reproducing encrypted content in a device connected to a network, the method including the operations of receiving the encrypted content to be reproduced; requesting a token for decrypting the received content from an external device containing a first partial key of the device via the network; receiving the requested token from the external device; and decrypting the received token by using a second partial key contained in the device.

The operation of requesting the token may further include the operation of transmitting an identification (ID) of the device and the encrypted content.

The token may be a mediate decryption value of the transmitted encrypted content calculated by using the first partial key of the device corresponding to the transmitted ID.

The method may further include the operation of checking revocation of the device corresponding to the transmitted ID, and as a result of the checking, when the device has been revoked, receipt of the token fails.

According to another aspect of the present invention, there is provided a method of approving reproduction of encrypted content by a security mediated module connected to a network, the method including the operations of receiving a request for a token for decrypting the encrypted content from a device; generating the requested token by using a partial key of the device, wherein the partial key is contained in the security mediated module, according to the received request; and transmitting the generated token to the device via the network.

The operation of receiving the request for the token may further include the operation of receiving an ID of the device and the encrypted content.

The token may be a mediate decryption value of the received encrypted content calculated by using a partial key of the device corresponding to the received ID.

The method may further include the operation of checking revocation of the device corresponding to the received ID, and as a result of the checking, when the device has been revoked, a request for the token is rejected.

According to another aspect of the present invention, there is provided a reproduction device reproducing encrypted content and being connected to a network, the reproduction device including an input unit receiving the encrypted content to be reproduced; a token processing unit requesting a token for decrypting the received content from an external device containing a first partial key of the reproduction device via the network, and receiving the requested token; a decryption unit decrypting the received token by using a second partial key contained in the reproduction device; and an output unit reproducing the decrypted content.

The token processing unit may transmit an ID of the reproduction device and the encrypted content to the external device.

The token may be a mediate decryption value of the transmitted encrypted content calculated by using the first partial key of the reproduction device corresponding to the transmitted ID.

According to revocation of the reproduction device corresponding to the transmitted ID, the token processing unit may fail to receive the token when the reproduction device has been revoked.

According to another aspect of the present invention, there is provided an approval device approving reproduction of encrypted content and being connected to a network, the approval device including a token interface receiving a request for a token for decrypting the encrypted content from a reproduction device, and transmitting the requested token; and a token generation unit generating the requested token by using a partial key of the reproduction device, wherein the partial key is contained in the approval device, according to the received request.

The token interface may receive an ID of the reproduction device and the encrypted content.

The token may be a mediate decryption value of the received encrypted content calculated by using a partial key of the reproduction device corresponding to the received ID.

According to another aspect of the present invention, there is provided a computer readable recording medium having recorded thereon a program for executing a reproduction method, the reproduction method including the operations of receiving encrypted content to be reproduced; requesting a token for decrypting the received content from an external device containing a first partial key of a device via a network; receiving the requested token from the external device; and decrypting the received token by using a second partial key contained in the device.

According to another aspect of the present invention, there is provided a computer readable recording medium having recorded thereon a program for executing an approval method, the approval method including the operations of receiving a request of a token for decrypting encrypted content from a device; generating the requested token by using a contained partial key of the device, according to the received request; and transmitting the generated token to the device via an external network.

BRIEF DESCRIPTION OF THE DRAWINGS

The above and other aspects of the present invention will become more apparent by describing in detail exemplary embodiments thereof with reference to the attached drawings in which.

In the drawings, whenever the same element reappears in subsequent drawings, it is denoted by the same reference numeral. Although the drawings illustrate exemplary embodiments of the present invention, the drawings are not drawn according to a reduced scale, and the thicknesses of layers and regions may be exaggerated for clarity.

DETAILED DESCRIPTION OF EXEMPLARY EMBODIMENTS OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings.

Figure 2:
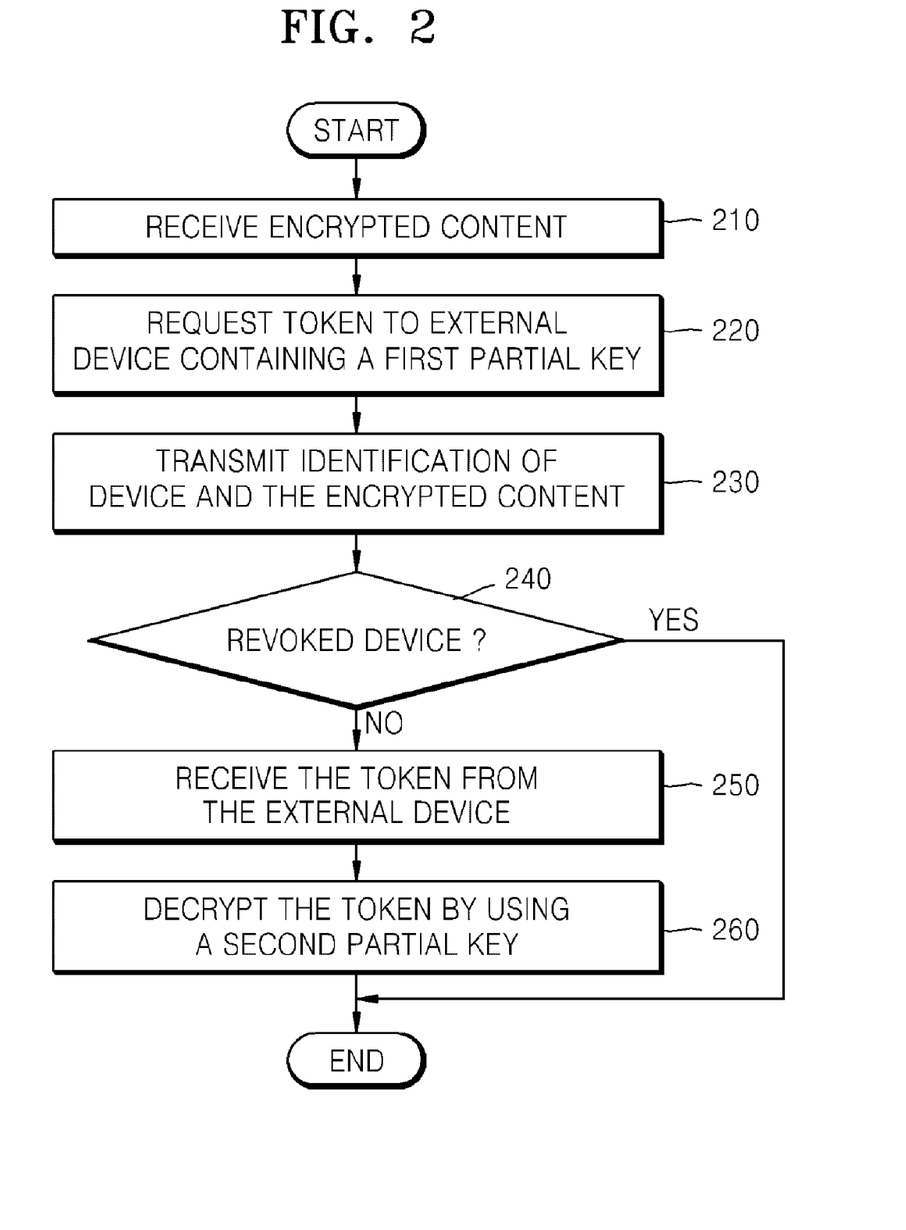
FIG. 2 is a flowchart illustrating a method of reproducing encrypted content in a device connected to a network according to an exemplary embodiment of the present invention.

FIG. 2 is a flowchart illustrating a method of reproducing encrypted content in a device connected to a network according to an exemplary embodiment of the present invention.

Referring to FIG. 2, the reproduction method according to the present invention includes operations of receiving the encrypted content to be reproduced (operation 210), requesting a token for decrypting the received content from an external device containing a first partial key of the device via the connected network (operation 220), receiving the requested token from the external device (operation 250), and decrypting the received token by using a second partial key contained in the device (operation 260).

In addition, the reproduction method according to the present invention may further include operations of transmitting an identification (ID) of the device and the encrypted content (operation 230), and determining whether the device corresponding to the delivered ID has been revoked (operation 240).

To be more specific, data of the content encrypted and stored in a recording medium may be input by using a wired/wireless communication link in operation 210. At this time, the recording medium may be magnetic storage media such as read-only memory (ROM), floppy disks (FDs), and hard disk drives (HDD), and optical recording media such as CD-ROMs, Digital Video Discs (DVDs), Blu-ray discs, and the like.

In a process of decrypting encrypted data, so as to reproduce received content in a device, a device key that is to be used as a decryption key is required. In the present invention, the device key is divided into first and second partial keys, each of which is separately allocated at an external security mediated module and the device.

An encryption method used in the present invention is a symmetric encryption method based on a public key-private key construction. At this time, a method of calculating a public key for publishing and a private key for division into a first partial key and a second partial key is illustrated below.

Choose a finite field Zp* having an order p.
Choose a cyclic subgroup G in which an order of Zp* is q. At this time, q is a divisor of p−1. That is, q|p−1 is realized.
Choose generators $g_1$ and $g_2$ for generating G.
Choose two polynomials Equations 1 and 2, which are illustrated below, whose degree is t, and maintain the two polynomials with a private key.

$$A(x) = a_0 + a_1 x^1 + a_t x^t \in Z_q[x] \quad \text{[Equation 1]}$$

$$B(x) = b_0 + b_1 x^1 + b_t x^t \in Z_q[x] \quad \text{[Equation 2]}$$

(At this time, an ID of a device i is x_i. x_i is an element of $Z_q$.)

By using the above Equations 1 and 2, a partial key <x_i, A(x_i)> is allocated to the device, and a partial key <x_i, B(x_i)> is allocated to the security mediated module.

(v) For a private key, Equation 3 is published.

$$\begin{aligned} \text{Pub\_K} &= < g_1, g_2, y, (z_1, h_{11}, h_{21}), \ldots, (z_{1t}, h_{1t}, h_{2t}) > \quad \text{[Equation 3]} \\ &= < g_1, g_2, g_1^{A(0)} \cdot g_2^{B(0)}, (z_1, g_1^{A(z1)}, g_2^{B(z1)}), \ldots, \\ &\quad (z_t, g_1^{A(zt)}, g_2^{B(zt)}) > (z_1, z_2, \ldots, z_t \in Z_q) \end{aligned}$$

After that, the device requests the token from the security mediated module, so as to decrypt the content in operation 220. Since final data can be output by using token information transmitted from the security mediated module, wherein the token information is a mediate decryption value calculated thereby enabling decryption of the content to be completed by only a partial key contained in the device. That is, the mediate decryption value is a kind of partial decryption value calculated using a partial key contained in the security mediated module. Therefore, the mediate decryption value can be decrypted completely by only the device containing the other partial key.

In order to receive the token information from the external security mediated module connected to the network, the device transmits first the ID of the device itself and the encrypted content in operation 230.

At this time, the encrypted content that is to be transmitted is illustrated in Equation 4.

$$\begin{aligned} C &= < g_1^r, g_2^r, y^r \cdot M, (z_1, h_{11}^r, h_{21}^r), \ldots, \quad \text{[Equation 4]} \\ &\quad (z_t, h_{1t}^r, h_{2t}^r) > \\ &= < C, C', C_0, (z_1, C_{11}, C_{21}), \ldots, \\ &\quad (z_t, C_{1t}, C_{2t}) > \end{aligned}$$

(At this time, the content is indicated as $M$, and random $r \in Z_q$ is chosen.)

The reason for transmitting the ID of the device itself is that (i) the security mediated module extracts a remaining partial key of the device, wherein the remaining partial key has the same ID as the transmitted ID, and generates the requested token information, and (ii) the device requesting the token information is checked in advance in terms of whether the device has been revoked.

When the device requesting the token information is not included in a Revocation List (RL) in operation 240, the requested token is received from the security mediated module in operation 250, and the received token information is decrypted by using a remaining partial key contained in the device and output in operation 260.

Figure 3:
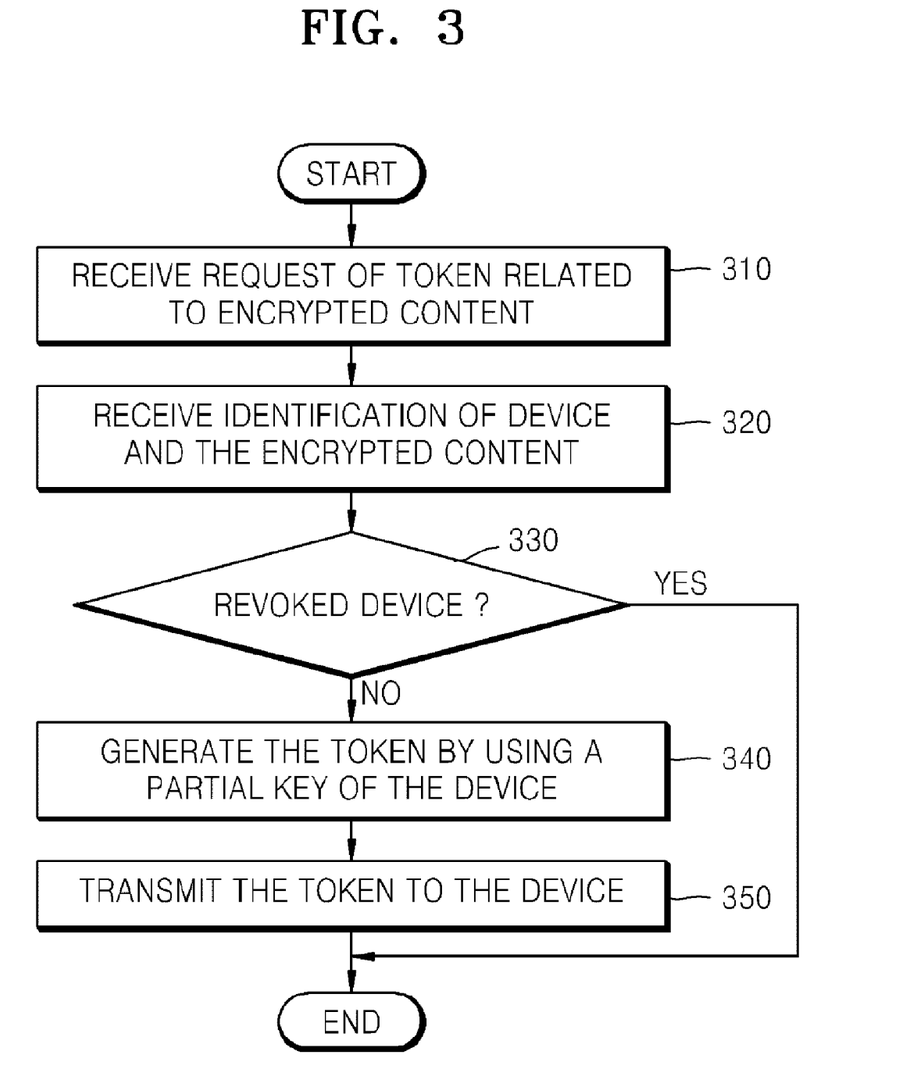
FIG. 3 is a flowchart illustrating a method of approving reproduction of encrypted content by a security mediated module connected to a network according to an exemplary embodiment of the present invention.

FIG. 3 is a flowchart illustrating a method of approving reproduction of encrypted content by a security mediated module connected to a network according to an exemplary embodiment of the present invention.

Referring to FIG. 3, the approval method according to the present invention includes the operations of receiving a request of a token for decrypting the encrypted content from a device (operation 310), according to the received request, generating the requested token by using a partial key of the device, wherein the partial key is contained by the security mediated module, (operation 340), and transmitting the generated token to the device via the network (operation 350).

In addition, the approval method according to the present invention may selectively further include the operations of further receiving an ID of the device and the encrypted content (operation 320), and determining whether the device corresponding to the received ID has been revoked (operation 330).

That is, when the device performs decryption, the security mediated module intervenes in an intermediate stage of the decryption and performs a part of the decryption. The reason for requiring such a procedure is, after an illegally copied device is registered in an RL as described above in relation to the conventional revocation system, not only newly encrypted and distributed contents, but also previously encrypted and distributed contents, are prevented from being reproduced.

Token information generated by the security mediated module is a mediate decryption value of the received encrypted content calculated by using a partial key of the device corresponding to the received ID. This calculation is illustrated in Equation 5.

$$\text{Token} = C_0 / (C')^{(\beta i)0} \prod_{k=1}^{t} (C_{21})^{(\beta i)1} \qquad \text{[Equation 5]}$$
$$= y^r \cdot M / (g_2^r)^{B(x\_i)} \prod_{k=1}^{t} (g_2^r)^{B(zk)}$$
$$= g_1^{A(0)r} \cdot g_2^{B(0)r} \cdot M / g_2^{rB(0)}$$
$$= g_1^{A(0)r} \cdot M$$

Figure 4:
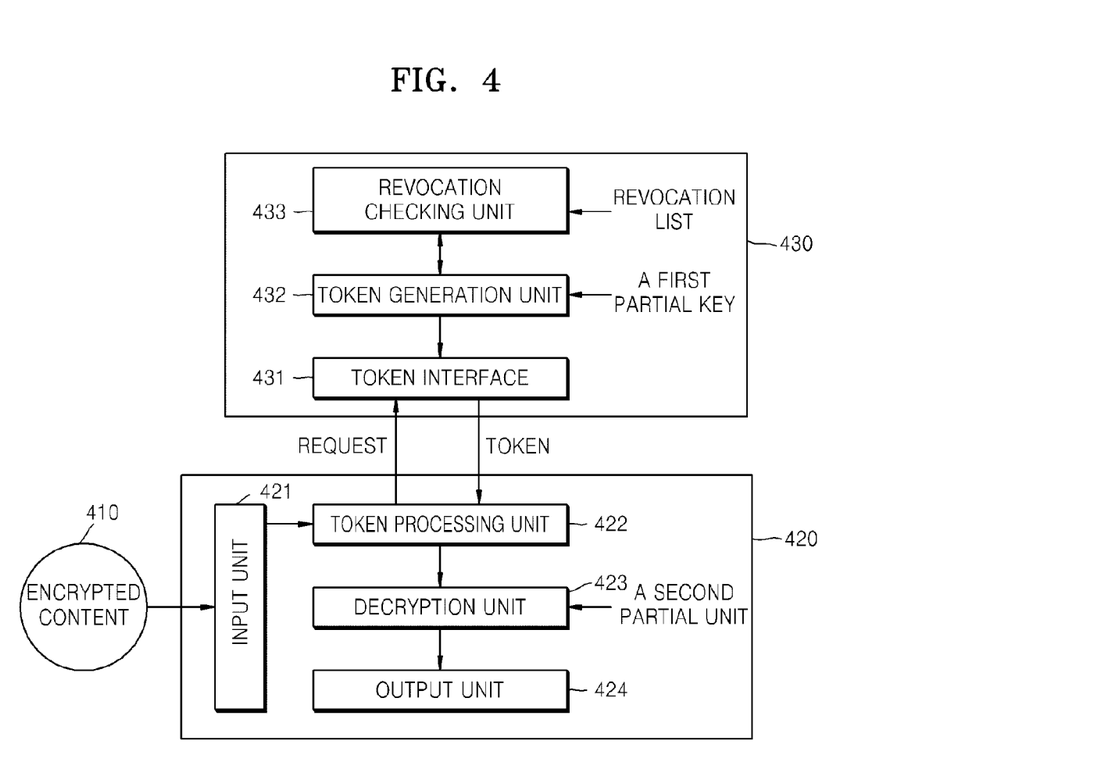
FIG. 4 is a functional block diagram illustrating a reproduction device and an approval device approving reproduction of content, wherein the reproduction device and approval device are connected to a network, according to an exemplary embodiment of the present invention.

FIG. 4 is a functional block diagram illustrating a reproduction device 420 and an approval device 430 approving reproduction of content, wherein the reproduction device 420 and approval device 430 are connected to a network, according to an exemplary embodiment of the present invention.

Referring to FIG. 4, the reproduction device 420 includes an input unit 421 which receives encrypted content 410 that is to be reproduced, a token processing unit 422 which requests a token for decrypting the received content 410 from an external device 430 containing a first partial key via the network and receiving the requested token from the external device 430, a decryption unit 423 which decrypts the received token by using a second partial key contained in the reproduction device 420, and an output unit 424 which reproduces the decrypted content.

The approval device 430 approving reproduction of encrypted content serves as a security mediated module. The approval device 430 includes a token interface 431 which receives a request for a token for decrypting the encrypted content from the reproduction device 420 and transmits the requested token, and a token generation unit 432 which generates the requested token by using the first partial key contained in the approval device 430, according to the received request. In addition, the approval device 430 selectively may further include a revocation checking unit 433 which scans a RL and determines whether an ID of the reproduction device 420 is included in the RL, and if the revocation checking unit 433 determines that the reproduction device 420 requesting the token has been revoked, the token generation unit 432 rejects generation of the requested token.

The decryption unit 423 in the reproduction device 420 receives the requested token, and extracts content data M by using the calculation as illustrated below in Equation 6.

$$M = \text{Token}/(C)^{(ai)0} \prod_{l=1}^{t} (C_{1l})^{(ai)l} \qquad \text{[Equation 6]}$$
$$= g_1^{A(0)r} \cdot M / (g_1)^{rA(x\_i)} \prod_{k=1}^{t} (g_1^r)^{A(zk)}$$
$$= g_1^{A(0)r} \cdot M / g_1^{A(0)r}$$

In a decryption system including the reproduction device 420 and the approval device 430, a revoked device from which a device key has been leaked cannot reproduce content after revocation. Although the revoked device attempts to reproduce content before revocation, the revoked device cannot receive a token from the approval device 430, and therefore immediate revocation is possible.

Further, after the revocation is performed, a public key is revised as illustrated in Equation 7 and re-published.

$$\text{Pub\_K} = <g_1, g_2, y, (z_1, h_{11}, h_{21}), \ldots, \qquad \text{[Equation 7]}$$
$$(z_{1t}, h_{1t}, h_{2t})>$$
$$= <g_1, g_2, g_1^{A(0)} \cdot g_2^{B(0)}, (x_1, g_1^{A(x1)}, g_2^{B(x1)}), \ldots,$$
$$(x_t, g_1^{A(xk)}, g_2^{B(xk)}),$$
$$(z_{k+1}, g_1^{A(zk+1)}, g_2^{B(zk+1)}), \ldots, (z_t, g_1^{A(zt)}, g_2^{B(zt)})>$$
$$\begin{pmatrix} x_1, x_2, \ldots, x_k \\ \text{are assumed to be } IDs \text{ of} \\ \text{devices to be revoked.} \end{pmatrix}$$

The method of reproducing the encrypted content and approving reproduction of the encrypted content according to the present invention can be written as computer programs and can be implemented in general-use digital computers that execute the programs using a computer readable recording medium.

In addition, a data structure used in the exemplary embodiments of the present invention can be written in a computer readable recording medium by various means.

Examples of the computer readable recording medium include magnetic storage media (e.g., ROM, floppy disks, hard disks, etc.), and optical recording media (e.g., CD-ROMs, or DVDs).

As described above, the method of reproducing the encrypted content and approving reproduction of the encrypted content according to the exemplary embodiments of the present invention can prevent content encrypted and distributed before revocation of the illegally copied device from being reproduced, thereby minimizing damage due to key leakage.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of reproducing an encrypted content in a device connected to a network, the method comprising:
    receiving the encrypted content to be reproduced;
    requesting a token for decrypting the received content from an external device containing a first partial key of the device via the network;
    receiving the requested token from the external device; and
    decrypting the received token by using a second partial key contained in the device,
    wherein if it is determined that the device has been revoked, receipt of the token fails,
    wherein a device key is divided to create the first partial key and the second partial key,
    wherein the requesting the token further comprises transmitting an identification (ID) of the device and the encrypted content, and wherein the token comprises a mediate decryption value of the transmitted encrypted content calculated based on the first partial key of the device corresponding to the transmitted ID.

2. The method of claim 1, further comprising determining whether the device corresponding to the transmitted ID has been revoked, and if it is determined that the device has been revoked, receipt of the token fails.

3. A method of approving reproduction of an encrypted content by a security mediated module connected to a network, the method comprising:

receiving a request for a token for decrypting the encrypted content from a device;

generating the token based on a partial key of the device, according to the received request, wherein the partial key is contained in the security mediated module; and transmitting the generated token to the device via the network, wherein if it is determined that the device has been revoked, a request for the token is rejected, wherein a device key is divided to create the partial key, wherein the receiving the request for the token further comprises receiving an identification (ID) of the device and the encrypted content, and wherein the token comprises a mediate decryption value of the received encrypted content calculated by using a partial key of the device corresponding to the received ID.

4. The method of claim 3, further comprising determining whether the device corresponding to the received ID has been revoked, and if it is determined that the device has been revoked, a request for the token is rejected.

5. A reproduction device reproducing an encrypted content and being connected to a network, the reproduction device comprising:

an input unit which receives the encrypted content to be reproduced;

a token processing unit which requests a token for decrypting the received content from an external device containing a first partial key of the reproduction device via the network, and receives the requested token;

a decryption unit which decrypts the token received by the token processing unit, based on a second partial key contained in the reproduction device; and an output unit which reproduces the decrypted content, wherein if the reproduction device has been revoked, the token processing unit fails to receive the token, wherein a device key is divided to create the first partial key and the second partial key, wherein the token processing unit transmits an identification (ID) of the reproduction device and the encrypted content to the external device, wherein the token comprises a mediate decryption value of the transmitted encrypted content calculated based on the first partial key of the reproduction device corresponding to the transmitted ID.

6. The method of claim 5, wherein if the reproduction device corresponding to the transmitted ID has been revoked, the token processing unit fails to receive the token.

7. An approval device approving reproduction of an encrypted content and being connected to a network, the approval device comprising:

a token interface which receives a request for a token for decrypting the encrypted content from a reproduction device, and transmits the requested token; and a token generation unit which generates the requested token based on a partial key of the reproduction device, according to the received request, wherein the partial key is contained in the approval device, wherein if the reproduction device has been revoked, the token generation unit rejects generation of the requested token, wherein a device key is divided to create the partial key, wherein the token interface receives an identification (ID) of the reproduction device and the encrypted content, wherein the token comprises a mediate decryption value of the received encrypted content calculated based on a partial key of the reproduction device corresponding to the received ID.

8. The method of claim 7, further comprising a revocation checking unit which contains a revocation list of the reproduction device corresponding to the received ID, and if the reproduction device has been revoked, the token generation unit rejects generation of the requested token.

9. A non-transitory computer readable recording medium having recorded thereon a program for executing a method of reproducing an encrypted content in a device connected to a network, the method comprising:

receiving encrypted content to be reproduced;

requesting a token for decrypting the received content from an external device containing a first partial key of the device via the network;

receiving the requested token from the external device; and decrypting the received token by using a second partial key contained in the device, wherein if it is determined that the device has been revoked, receipt of the token fails, wherein a device key is divided to create the first partial key and the second partial key, wherein the requesting the token further comprises transmitting an identification (ID) of the device and the encrypted content, and wherein the token comprises a mediate decryption value of the transmitted encrypted content calculated based on the first partial key of the device corresponding to the transmitted ID.

10. A non-transitory computer readable recording medium having recorded thereon a program for executing a method of approving reproduction of an encrypted content by a security mediated module connected to a network, the method comprising:

receiving a request for a token for decrypting the encrypted content from a device;

generating the token based on a partial key of the device, according to the received request, wherein the partial key is contained in the security mediated module; and transmitting the generated token to the device via the network, wherein if it is determined that the device has been revoked, a request for the token is rejected, wherein a device key is divided to create the partial key, wherein the receiving the request for the token further comprises receiving an identification (ID) of the device and the encrypted content, and wherein the token comprises a mediate decryption value of the transmitted encrypted content calculated based on the first partial key of the device corresponding to the transmitted ID.

11. The method according to claim 1, wherein the token comprises a partial decryption value calculated using the first partial key contained in the external device and the second partial key contained in the device.

* * * * *